No. 785,533. PATENTED MAR. 21, 1905.
E. F. W. ALEXANDERSON.
TWO SPEED WINDING FOR THREE PHASE MOTORS.
APPLICATION FILED AUG. 13, 1904.
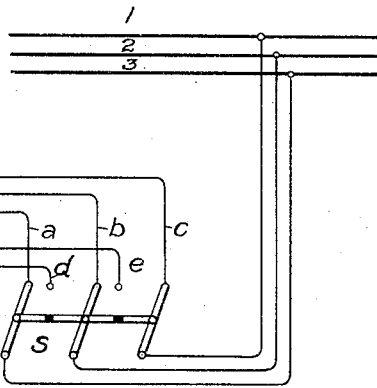
Fig.1.
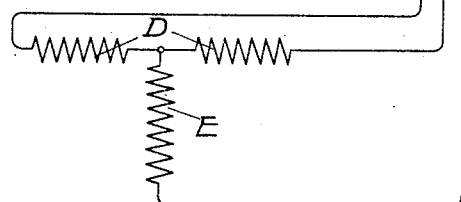
Fig.2.
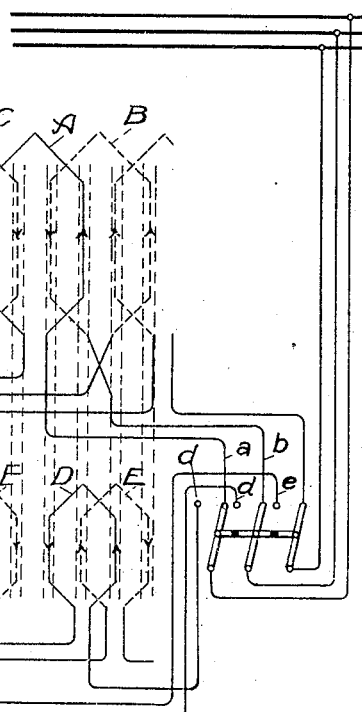
WITNESSES:
Robt C. Chapman
Helen Orford
INVENTOR:
Ernst F. W. Alexanderson,
by Albert G. Davis
Atty.

No. 785,533. Patented March 21, 1905.

UNITED STATES PATENT OFFICE.

ERNST F. W. ALEXANDERSON, OF SCHENECTADY, NEW YORK, ASSIGNOR TO GENERAL ELECTRIC COMPANY, A CORPORATION OF NEW YORK.

TWO-SPEED WINDING FOR THREE-PHASE MOTORS.

SPECIFICATION forming part of Letters Patent No. 785,533, dated March 21, 1905.

Application filed August 13, 1904. Serial No. 220,608.

*To all whom it may concern:*

Be it known that I, ERNST F. W. ALEXANDERSON, a subject of the King of Sweden and Norway, residing at Schenectady, county of Schenectady, State of New York, have invented certain new and useful Improvements in Two-Speed Windings for Three-Phase Motors, of which the following is a specification.

My invention relates to drum-windings for three-phase motors; and its object is to reduce the number of slots required for a variable-speed three-phase motor with certain speed ratios. In drum-windings as ordinarily arranged in order to produce evenly-spaced poles, while at the same time permitting the use of former-wound coils, a total number of slots is chosen which is a multiple of the number of poles and the number of phases. With a three-phase winding for a large number of poles the above arrangement necessitates a large number of slots. Furthermore, when it is attempted to design such a winding for more than one number of poles the total number of slots must be a multiple not only of the number of phases, but also of both numbers of poles. With high-potential machines the cost and difficulty of insulating the armature-coils increase with the number of slots, so that a variable-speed three-phase winding for high potentials and a large number of poles becomes excessively expensive.

The object of my invention is to provide a novel winding for three-phase machines which will give certain ratios of pole-numbers, so as to produce a variable-speed motor with a minimum number of slots.

My invention consists in providing the motor with two windings, one of the ordinary three-phase type and the other a two-phase winding connected for three-phase operation. As has been said, the total number of slots must be a multiple of the number of poles and number of phases. Consequently it follows that for a given number of poles the minimum number of slots required for a two-phase winding is only two-thirds of the number required for a three-phase winding, or, stated another way, with a given number of slots fifty per cent. more poles may be produced with a two-phase winding than with a three-phase winding.

My invention will best be understood by reference to the accompanying drawings, in which—

Figure 1 shows diagrammatically the windings of a machine arranged in three-phase and two-phase in accordance with my invention. Fig. 2 shows a development of the two windings.

Although in the drawings the two windings are shown separately for the sake of clearness, it will be understood that they are to be placed in the same slots. This is indicated in Fig. 2 by the dotted lines extending across the two sets of conductors, which are shown one immediately below the other.

In the drawings, A B C represent the three phases of an ordinary three-phase winding, which in this case I have shown as Y-connected.

D and E represent the two phases of a two-phase winding connected in T in the manner well known in the art to adapt it for three-phase operation.

S represents a switch by means of which either of the two windings may be connected to a source of current 1 2 3. The switch-terminals are indicated by small letters corresponding to the several phases of the motor-winding to which they are connected.

The development of the two windings is clearly shown in Fig. 2. For the sake of clearness only the phase A of the three-phase winding is shown in full lines, the other two phases being shown in dotted lines. The arrow-heads indicate the relative distribution of current at any moment. Current is supposed to be entering phase A at terminal *a* and dividing upon reaching the neutral point and passing out through the phases B and C in parallel. It will be seen that eight poles are produced by the winding, which is contained in twenty-four slots, this number being the least common multiple of the number of poles and number of phases. The lower portion of Fig. 2 shows a development of the two-phase winding. The arrows show the relative directions of the currents in the conductors at any given moment when this winding is connected to the source. The current is supposed to be entering at terminal $d$ of phase D and on reaching the point of connection of windings D and E dividing and passing out through the other portion of phase D and phase E in parallel. An inspection of the arrows shows that twelve poles are produced, the total number of slots again being the product of the number of poles and the number of phases. Thus by means of the separate windings—one three-phase and the other two-phase—I am enabled to obtain either eight or twelve poles with twenty-four slots, while if an ordinary three-phase winding were used seventy-two slots would be required for the same polar ratios.

Although I have shown the windings arranged to produce merely the speed ratio of two to three, it is evident that certain other ratios involving a multiple of one of these numbers may be obtained, the essential thing being that the two windings may occupy the same number of slots. Thus if the two-phase winding shown in the drawings is given twice the pitch shown without any other change it would produce six poles instead of twelve, giving a speed ratio of four to three instead of two to three, and would still fit into the slots of the three-phase winding. Consequently I do not desire to limit myself to the particular arrangement herein shown; but I aim in the appended claims to cover all modifications which are within the scope of my invention.

What I claim as new, and desire to secure by Letters Patent of the United States, is—

1. In an alternating-current motor, a three-phase winding, a two-phase winding in the same slots therewith, and means for connecting either winding to a source of three-phase current.

2. In an alternating-current motor, a three-phase winding, a two-phase winding of different pitch in the same slots therewith, and means for connecting either winding to a source of current.

3. In an alternating-current motor, a three-phase winding, a two-phase winding of a different number of poles in the same slots therewith, and means for connecting either winding to a source of three-phase current.

4. In an alternating-current motor, a three-phase winding, and a T-connected two-phase winding in the same slots therewith.

In witness whereof I have hereunto set my hand this 12th day of August, 1904.

ERNST F. W. ALEXANDERSON.

Witnesses:
BENJAMIN B. HULL,
HELEN ORFORD.